United States Patent Office 2,824,009
Patented Feb. 18, 1958

2,824,009

SUGAR COATED FOOD PRODUCTS AND METHOD OF MAKING THE SAME

Carl W. Lindow, Battle Creek, Mich., assignor of twenty-five percent to Ira Milton Jones, Milwaukee, Wis.

No Drawing. Application November 12, 1954
Serial No. 468,550

4 Claims. (Cl. 99—166)

This invention relates to sugar coated food products, and has more particular reference to the provision of sugar coated food products which have improved taste characteristics and keeping qualities far superior to those heretofore available.

In a specific sense, this invention concerns dry breakfast cereals of the type which are sugar coated and known generally as pre-sweetened cereals. As is well known, such pre-sweetened breakfast cereals are comparatively new, and when first introduced were immediately accepted by the consuming public.

It soon became apparent, however, especially when stocks of such pre-sweetened cereals began to accumulate, that atmospheric moisture had an extremely bad effect upon the product. Not only did the transparent sugar coating become tacky and sticky under ordinary atmospheric conditions, but the cereal fraction beneath the coating quickly lost the desirable crispness which is considered a requisite of breakfast cereals.

As a result of these shortcomings of past pre-sweetened breakfast cereals, the industry was forced to adopt expensive packaging methods, involving the use of materials capable of preventing moisture from coming in contact with sugar coated cereals packaged therein. In other words, the only defense heretofore available against the ill effects of moisture on pre-sweetened breakfast cereals, has been to package the cereals in so-called vapor-proof bags made of aluminum foil and the like.

Despite the great additional expense which such packaging entails, the conventional pre-sweetened breakfast cereals cannot be maintained in the most desirable condition, namely with a dry non-tacky coating and a crisp body of cereal therebeneath, after the package containing them has once been opened. Within a short time after the package is first opened, and despite the fact that the package has been reclosed by the consumer, the cereal looses its crispness and the sugar coating thereon becomes sticky and tacky to the touch. These undesirable characteristics of presweetened breakfast cereals quite understandably have resulted in limited sales.

The tendency of past sugar coated food products toward becoming tacky and sticky results from the inherent hydrophilic capacity of the sucrose which comprises the coating; and the absorption of moisture, I have found, is more pronounced when a small quantity of invert sugar is present in the sucrose syrup used as the coating agent. Invert sugar, of course, is produced from the chemical decomposition of a minute quantity of sucrose during heating of the syrup, and its presence to a large degree determines the types and physical characteristics of sugar molecules ultimately deposited upon the dry cereal as the sugar coating.

The primary object of this invention, therefore, is to provide a sugar coated food product wherein neither the body of the product nor the coating thereon is affected deleteriously by atmospheric moisture.

More specifically it is an object of this invention to provide a sugar coated food product, such as a pre-sweetened breakfast cereal for example, wherein the sugar coating is comprised of sucrose and a small amount of lactose, has substantially all of the physical and chemical characteristics of lactose, and is singularly free from tackiness and stickiness characteristic of previous sucrose coatings used on cereals.

It is not understood how the presence of lactose in the sugar coating alters the physical and chemical characteristics of sucrose in the desired manner to assure these highly desirable results, but it is believed that the lactose may have a neutralizing effect upon the invert sugar which forms in the coating syrup, or in some way inhibits the tendency of invert sugar to promote stickiness and tackiness in the coated product.

With the above and other objects in view, which will appear as the description proceeds, this invention resides in the novel product and method by which it is made, substantially as hereafter described and more particularly defined by the appended claims, it being understood that such changes in the precise embodiment of the herein disclosed invention may be made as come within the scope of the claims.

This invention is based upon the discovery that a small quantity of lactose combined with sucrose effects conversion of the physical and chemical properties of the sucrose substantially to those of lactose. The sucrose-lactose sugar coating of this invention, therefore, is opaque, has an amorphous microcrystalline structure, is completely anhydrous and non-hygroscopic; and moreover acts as a vapor barrier to largely prevent atmospheric moisture from penetrating to the cereal or other food product coated thereby.

In the method of this invention, ordinary dry breakfast cereal, for example puffed wheat, puffed rice or the like, is treated with lactose in a pulverized state. The lactose may be dusted onto the cereal and substantially uniformly distributed over the surface thereof. The cereal thus dusted with lactose is then covered with a sucrose syrup, as by immersing or dipping a quantity of the dusted cereal into a container having the sucrose syrup maintained therein at a temperature of from about 270° to 310° F. These temperatures are below that at which caramelization of the sucrose takes place, and generally, the temperature should be decreased in this range in inverse proportion to the amount of lactose used. After momentary immersion, the cereal is lifted out of the heated sucrose syrup, drained, and spread out for cooling.

After being cooled, it will be found that the sugar coating is opaque, as distinguished from the transparent sucrose coating of conventional pre-sweetened cereals. Moreover, the coating is amorphous and non-hygroscopic, so as to be free of stickiness and tackiness characteristic of sucrose coatings. In general, the physical and chemical characteristics of the coating, though comprised mainly of sucrose, will be substantially identical to those of lactose. The sucrose-lactose sugar coating of this invention also will be found to have a microcrystalline structure comprised of extremely small hard rhombic prisms characteristic of cane sugar crystals; and while conventional presweetened breakfast cereals tend to become tacky and sticky at the slightest trace of moisture in the atmosphere, the sugar coating of this invention remains dry. What is of equal importance, however, is the fact that the coating acts as a vapor barrier to prevent atmospheric moisture from penetrating to the body of dry cereal therebeneath.

The percentage of lactose to sucrose, by weight, necessary to achieve the purposes of this invention is not highly critical. The amount of lactose used, however, should not be less than about 3% to 4% of the weight of sucrose used in the coating syrup. Any greater amount of lactose can be used without ill effects, but if the amount of lactose exceeds 20% of the weight of sucrose used in the coating syrup, the cost becomes excessive. Excellent results are obtained when the amount of lactose used is between 5% and 10% of the weight of sucrose.

Conventional pre-sweetened breakfast cereals may have a sucrose coating thereon comprising at least 25% of the weight of the coated product. Generally, the industry seeks to coat the cereals with as much sugar as possible, but seldom, if ever, produces a product containing in excess of 50% sugar by weight. The tendency of the sucrose coated products to become sticky and tacky when exposed to the atmosphere is even more pronounced with products containing the higher percentages of sugar.

When lactose is incorporated in the sucrose coating in accordance with this invention, dry breakfast cereals or other pre-sweetened food products may be produced containing much more than 50% of sugar (sucrose and lactose) by weight without any danger of the coated products becoming sticky or tacky.

The following are actual examples of the method employed for the production of sugar coated dry breakfast cereals having all of the desirable characteristics herein claimed:

*Example A*

One ounce of lactose was dusted onto one pound of commercial non-sweetened dry breakfast cereal of the type known as puffed wheat, in a bowl, and uniformly distributed over the surfaces of the cereal. The cereal thus dusted with lactose was ready to be dipped into sucrose syrup.

The syrup was produced by dissolving one pound of sucrose in three-quarters of a pound of water, and this solution was boiled under constant agitation until a temperature of 286° F. was reached. This temperature, of course, is below the caramelization temperature of sucrose.

The dusted cereal was then placed in a coarse wire strainer and dipped into the hot cane sugar syrup. After momentary immersion in the syrup the cereal was lifted out of the solution, drained and spread out for cooling. The resulting pre-sweetened breakfast cereal contained about 45% of sugar, both sucrose and lactose, by weight.

*Example B*

One and one-quarter ounces of lactose was dusted onto one pound of commercial non-sweetened dry breakfast cereal of the type known as wheat checks, in a bowl, and uniformly distributed over the surfaces of the cereal. The cereal thus dusted with lactose was ready to be dipped into sucrose syrup.

The syrup was produced by dissolving one pound of sucrose in three-quarters of a pound of water and this solution was boiled under constant agitation until a temperature of 275° F. was reached.

The dusted cereal was then placed in a coarse wire strainer and dipped into the hot cane sugar syrup. After momentary immersion in the syrup, the cereal was lifted out of the solution, drained and spread out for cooling.

*Example C*

Three-quarters of an ounce of lactose was dusted onto one pound of commercial non-sweetened dry breakfast cereal of the type known as rice checks, in a bowl, and uniformly distributed over the surfaces of the cereal. The cereal thus dusted with lactose was ready to be dipped into sucrose syrup.

The syrup was produced by dissolving one pound of sucrose in three-quarters of a pound of water and this solution was boiled under constant agitation until a temperature of 280° F. was reached.

The dusted cereal was then placed in a coarse wire strainer and dipped into the hot cane sugar syrup. After momentary immersion in the syrup, the cereal was lifted out of the solution, drained and spread out for cooling.

This method may be practiced commercially in a revoluble drum. For example, the food products to be coated are charged into the drum, along with the desired amount of lactose, and uniform distribution of the lactose accomplished by rotating the drum. The drum, of course, should be maintained at a temperature substantially corresponding to that of the sucrose syrup, namely, from about 270° F. to 310° F.

When the lactose has been substantially uniformly distributed over the food products in the drum, the desired quantity of sucrose syrup may then be squirted or sprayed into the drum onto the lactose dusted food product, while the drum is rotating, to effect coating of all surfaces of the product. Thereafter, the food product is cooled to effect crystallization of the coating thereon, and removed from the drum. While cooling may be readily accomplished by injecting cold air into the interior of the revolving drum, other controlled means for cooling the drum and its contents will suggest themselves to those skilled in the art.

When tested organoleptically, the pre-sweetened or sugar coated cereals prepared according to the above method and examples have a highly desirable flavor. The sugar coating is less sweet than cane sugar, is less soluble in water, and therefore has less tendency to cloy or inhibit the appetites of children.

The outstanding advantages of the sugar coated food product of this invention are its freedom from tackiness or stickiness, and the fact that the coating acts as a vapor barrier preventing moisture from penetrating the cereal or other food body. Sugar coated food products made in accordance with this invention, therefore, have exceptionally good keeping qualities, and may be packaged like ordinary dry breakfast cereals. The cost of packaging pre-sweetened cereals particularly thus can be tremendously reduced, and it is contemplated that this will effect a large saving to the consumer. Even after opening a package of breakfast cereal having the sugar coating of this invention thereon, there will be little danger of the coating becoming tacky or sticky by exposure to atmospheric moisture.

It will be understood, of course, that the term "food products" as used in the foregoing is not intended to be limited to only such dry breakfast cereals as puffed wheat, puffed rice, rice checks, wheat checks and corn flakes, but is applicable as well to confections of many different types, including baked goods such as doughnuts and the like, and even nuts. These products can be greatly benefited by the sugar coating of this invention, which functions as well to prevent loss of moisture as it does to prevent staleness of the product resulting from absorption of moisture. In the case of baked goods such as doughnuts, the baked products having the sugar coating of this invention may be placed on display all day or longer, without taking on the "sweaty" appearance which quickly results from the absorption of moisture by ordinary sugar glazings, or crystallized cane sugar sprinkled on the products.

From the foregoing description, it will be readily apparent to those skilled in the art that this invention provides a highly improved sugar coated food product from the standpoint of keeping qualities, taste, and nutritional balance; which is free from tackiness and stickiness characteristic of conventional sugar coating; and which has a better taste and less tendency to cloy or inhibit the appetite than the ordinary sugar coatings.

What I claim as my invention is:

1. A food product having a sugar coating comprised primarily of sucrose and in which the physical and chemical characteristics of the sucrose have been modified to substantially correspond to those of lactose by incorporation of the sucrose with an amount of lactose not less than about 3% to 4% of the sucrose (by weight).

2. A food product characterized by a sugar coating on said product comprised chiefly of sucrose but having physical and chemical characteristics corresponding to those of anhydrous milk sugar and providing a vapor barrier to prevent the food fraction beneath the coating from being deleteriously affected by atmospheric moisture, said sugar coating containing lactose in an amount ranging between 3% to 20% of the sucrose (by weight).

3. A food product, characterized by a microcrystalline sugar coating on said product comprised chiefly of sucrose, and wherein the physical and chemical properties of the sucrose have been converted to substantially correspond to those of lactose by the presence in the coating of a small amount of lactose, not less than about 3% to 4% of the sucrose (by weight).

4. In the herein described method of sugar coating food products, the steps of: dusting lactose substantially uniformly over all surfaces of the food products to be coated; applying a sucrose solution maintained at a temperature of about 270° F. to 310° F. to said products to cover all of the dusted surfaces thereof; and directly thereafter cooling said products to effect crystallization of the sucrose thereon.

References Cited in the file of this patent
UNITED STATES PATENTS

| | | |
|---|---|---|
| 1,877,641 | Bolton et al. | Sept. 13, 1932 |
| 2,196,395 | Kellogg | Apr. 9, 1940 |
| 2,333,442 | Rex | Nov. 2, 1943 |